United States Patent
Kaneko et al.

(10) Patent No.: US 8,863,923 B2
(45) Date of Patent: Oct. 21, 2014

(54) FLUID TRANSMISSION DEVICE

(75) Inventors: Toshimi Kaneko, Saitama (JP); Yasuhiro Morimoto, Saitama (JP); Yoshimichi Tsubata, Saitama (JP); Shoji Nomura, Saitama (JP); Yoshinori Tanaka, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 1563 days.

(21) Appl. No.: 12/017,713

(22) Filed: Jan. 22, 2008

(65) Prior Publication Data

US 2008/0173512 A1    Jul. 24, 2008

(30) Foreign Application Priority Data

Jan. 22, 2007  (JP) .................... 2007-011049

(51) Int. Cl.
*F16H 45/02* (2006.01)
*F16H 41/24* (2006.01)

(52) U.S. Cl.
CPC .......... *F16H 45/02* (2013.01); *F16H 2041/246* (2013.01); *F16H 2045/0247* (2013.01); *F16H 2045/0284* (2013.01); *F16H 2045/021* (2013.01); *F16H 2045/0215* (2013.01)
USPC ................. 192/3.3; 192/84.61; 192/113.34; 192/110 B

(58) Field of Classification Search
CPC ............................................. F16H 2045/0215
USPC ................ 60/339, 345; 192/3.29, 3.3, 110 B, 192/84.61, 113.34
See application file for complete search history.

(56) References Cited

U.S. PATENT DOCUMENTS

| 2,717,673 | A | * | 9/1955 | Zeidler ......................... 192/3.3 |
| 4,974,715 | A |   | 12/1990 | Koyama |
| 5,964,329 | A |   | 10/1999 | Kawaguchi |
| 6,431,335 | B1 | * | 8/2002 | Kundermann ................ 192/3.3 |
| 7,287,630 | B2 | * | 10/2007 | Takahashi ................... 192/3.29 |

(Continued)

FOREIGN PATENT DOCUMENTS

| CN | 1675483 A | 9/2005 |
| EP | 0 002 447 A1 | 6/1979 |

(Continued)

OTHER PUBLICATIONS

European Search Report issued Apr. 11, 2008 in EP 08 10 0431.

*Primary Examiner* — Gene Crawford
*Assistant Examiner* — Terry Chau
(74) *Attorney, Agent, or Firm* — Westerman, Hattori, Daniels & Adrian, LLP

(57) ABSTRACT

A fluid transmission device comprises: a cover member coupled to a drive shaft; a converter mechanism constituted by a pump impeller coupled to the cover member, a turbine runner connected to a driven shaft, and a stator disposed between the pump impeller and the turbine runner, a converter chamber through which a working fluid flows being formed in the interior thereof; a lockup mechanism having a clutch piston provided in a lockup chamber that is surrounded by the cover member and the turbine runner, which engages and disengages the drive shaft and driven shaft by supplying a control fluid to a clutch oil chamber surrounded by a back surface of the clutch piston and the cover member; an inlet passage for leading the working fluid into the lockup chamber from the outside; a communicating passage for leading the working fluid into the converter chamber from the lockup chamber; and an outlet passage for leading the working fluid to the outside from the converter chamber.

7 Claims, 6 Drawing Sheets

(56) References Cited

U.S. PATENT DOCUMENTS

| | | | |
|---|---|---|---|
| 7,699,150 B2 * | 4/2010 | Frey et al. | 192/3.3 |
| 7,708,126 B2 * | 5/2010 | Arhab et al. | 192/3.3 |
| 2001/0013454 A1 | 8/2001 | Yamamoto | |
| 2001/0052233 A1 * | 12/2001 | Maeda et al. | 60/345 |
| 2003/0066726 A1 * | 4/2003 | Saito et al. | 192/3.29 |
| 2003/0173175 A1 | 9/2003 | Tomiyama | |
| 2004/0065168 A1 | 4/2004 | Ida et al. | |
| 2004/0139743 A1 | 7/2004 | Sato | |
| 2006/0113157 A1 * | 6/2006 | Ichikawa et al. | 192/113.34 |
| 2009/0223767 A1 | 9/2009 | Arhab et al. | |

FOREIGN PATENT DOCUMENTS

| | | |
|---|---|---|
| EP | 1 619 415 A2 | 1/2006 |
| FR | 2839128 A1 | 10/2003 |
| FR | 2843433 A1 | 2/2004 |
| FR | 2 847 323 A1 | 5/2004 |
| JP | 06-221403 A | 8/1994 |
| JP | 6-221403 A | 8/1994 |
| JP | 11-63150 A | 3/1999 |
| JP | 2001-116110 A | 4/2001 |
| JP | 2005-133779 A | 5/2005 |
| WO | WO 2004015307 A1 * | 2/2004 |

* cited by examiner

FLUID TRANSMISSION DEVICE

FIELD OF THE INVENTION

The present invention relates to a fluid transmission device comprising a converter mechanism for effecting power transmission between a drive shaft and a driven shaft via a fluid, and a lockup mechanism for effecting power transmission bypassing the converter mechanism by engaging and disengaging the drive shaft and the driven shaft.

BACKGROUND OF THE INVENTION

To describe this fluid transmission device using a torque converter for a vehicle as an example, the device comprises a converter mechanism constituted by a pump impeller connected to an engine output shaft via a cover member, a turbine runner disposed opposite the pump impeller and connected to a transmission input shaft, and a stator disposed between the pump impeller and the turbine runner, and is constituted such that the power of the engine output shaft is transmitted to the transmission input shaft via a working oil that flows through a converter chamber formed in the interior of the converter mechanism. A torque converter having a lockup mechanism, in which a lockup mechanism is provided in a lockup chamber surrounded by the cover member and the turbine runner such that power transmission can be performed by directly coupling the engine output shaft and the transmission input shaft, is also widely known. A multiple disc clutch mechanism provided with a plurality of plate-shaped frictional engagement members may be used as the lockup mechanism.

In a typical torque converter having a lockup mechanism, the lockup mechanism is set in a released state at low speed such that power transmission between the two shafts is performed via the converter mechanism, and at high speed the lockup mechanism is set in an engaged state such that the two shafts are directly coupled and power transmission is performed bypassing the converter mechanism. In a transient state between release and engagement, control is performed to cause the lockup mechanism to slide, and therefore power transmission is performed in accordance with the operating conditions of the vehicle, enabling an improvement in fuel economy.

However, when this type of sliding control is performed, the amount of heat generation from the frictional engagement members increases, and this may affect the durability of the lockup mechanism. To counter this effect, a torque converter in which working oil supplied to the converter chamber is led into the lockup chamber so that the lockup mechanism is cooled by the working oil has been proposed in the related art (see Japanese Unexamined Patent Application Publication H6-221403, for example). In this torque converter, a passage is formed to lead the working oil from the converter chamber to the lockup chamber, and the lockup chamber (lockup mechanism) is provided in a passage for discharging the working oil in the converter chamber to the outside.

Problems to be Solved by the Invention

However, with this conventional constitution, the temperature of the working oil in the converter chamber rises during power transmission via the converter mechanism, and therefore, when the high-temperature working oil is used to cool the lockup mechanism, a sufficient cooling effect is difficult to obtain. Moreover, to supply the working oil to the lockup mechanism from the converter chamber, a constitution is required to cause the working oil to flow from an outer diameter side of the converter chamber to an inner diameter side of the lockup mechanism, and therefore the working oil must be caused to flow toward an inner diameter side in a diametrical direction against a centrifugal force generated by the rotating torque converter. To overcome this centrifugal force, the working oil supply pressure must be set high, and as a result, the plate thickness of the cover member and the members constituting the converter mechanism must be increased to secure pressure resistance, which may lead to increases in the size and weight of the torque converter.

SUMMARY OF THE INVENTION

The present invention has been designed in consideration of these problems, and it is an object thereof to provide a fluid transmission device with which a lockup mechanism can be cooled efficiently and the device constitution can be reduced in size and made more compact.

Means to Solve the Problems

To achieve this object, a fluid transmission device according to the present invention comprises: a cover member coupled to a drive shaft; a converter mechanism constituted by a pump impeller coupled to the cover member, a turbine runner connected to a driven shaft, which opposes the pump impeller and is covered by the cover member, and a stator disposed between the pump impeller and the turbine runner, for effecting power transmission between the drive shaft and the driven shaft via a working fluid that flows through a converter chamber formed internally; a lockup mechanism having a clutch piston that is provided in a lockup chamber surrounded by the cover member and a back surface of the turbine runner, for activating the clutch piston using a control fluid that is supplied to a clutch oil chamber surrounded by the cover member and a back surface of the clutch piston, and effecting power transmission bypassing the converter mechanism by engaging and disengaging the drive shaft and the driven shaft; an inlet passage for leading the working fluid into the lockup chamber from the outside; a communicating passage for leading the working fluid into the converter chamber from the lockup chamber; and an outlet passage for leading the working fluid to the outside from the converter chamber.

The fluid transmission device preferably further comprises a support member for supporting the stator on an outer peripheral side of the driven shaft. The inlet passage preferably includes a first inlet passage formed by cutting a notch in an inner peripheral surface of the support member on an outer peripheral side, and the outlet passage preferably includes a first outlet passage formed by cutting a notch in an outer peripheral surface of the support member on an inner peripheral side. The first inlet passage and first outlet passage are preferably formed in different circumferential direction positions relative to the support member.

The lockup mechanism preferably comprises a clutch guide connected to the cover member, a clutch hub connected to the turbine runner, and a frictional engagement member disposed in a clutch space surrounded by the clutch guide and the clutch hub, which is engaged and disengaged in accordance with an operation of the clutch piston. The lockup chamber is preferably partitioned by the clutch guide and the clutch hub into an inner peripheral side space on a diametrical direction inner peripheral side and an outer peripheral side space on a diametrical direction outer peripheral side via the clutch space. The clutch guide is preferably formed with a guide side through hole connecting one of the outer peripheral side space and the inner peripheral side space in the lockup chamber with the clutch space, and the clutch hub is preferably formed with a hub side through hole connecting the other of the outer peripheral side space and the inner peripheral side space in the lockup chamber with the clutch space. The inlet passage is preferably connected to the inner peripheral side space, and the communicating passage is preferably connected to the outer peripheral side space.

The pump impeller is preferably supported rotatably by a thrust bearing held by a holding member provided on a side face of the stator, and the outlet passage preferably includes a passage constituted by a recessed groove formed in a back surface of the holding member so as to extend radially on a side face of the stator.

Advantageous Effects of the Invention

According to the fluid transmission device of the present invention, the working fluid that is supplied to the device is initially supplied to the lockup chamber through the inlet passage. Note that the control fluid for engaging and disengaging the drive shaft and driven shaft is supplied to the clutch oil chamber, which is formed separately from the lockup chamber on the back surface side of the clutch piston, and therefore the working fluid supplied to the lockup chamber always flows in a single direction, regardless of the state of control fluid supply/discharge and the operational state of the clutch piston. The working fluid is supplied to the converter chamber through the communicating passage, employed in power transmission, and then discharged to the outside through the outlet passage. By means of this flow, the supplied working fluid can be used initially to cool the lockup mechanism, and therefore the cooling efficiency of the lockup mechanism can be improved in comparison with that of a conventional device.

Further, by forming the first inlet passage in the inner peripheral surface of the support member for supporting the stator and forming the first outlet passage in the outer peripheral surface of the support member in a different circumferential direction position to the first inlet passage, the size of the support member can be reduced and the rigidity thereof can be secured.

Furthermore, when the guide side through hole connecting one of the outer peripheral side space and the inner peripheral side space in the lockup chamber with the clutch space is formed in the clutch guide, the hub side through hole connecting the other of the outer peripheral side space and the inner peripheral side space in the lockup chamber with the clutch space is formed in the clutch hub, the inlet passage is connected to the inner peripheral side space, and the communicating passage is connected to the outer peripheral side space, the working oil flows into the inner peripheral side space from the inlet passage, passes through the clutch space, in which the frictional engagement member is disposed, via the through hole, flows into the outer peripheral side space through the through hole, and is then led into the communicating passage. Thus, the working oil flows through the lockup chamber from the inner peripheral side to the outer peripheral side, and therefore centrifugal force generated by rotation of the cover member and so on can be used to ensure that the working oil flows smoothly. Hence, the working oil forms an adjusted flow that flows smoothly even when the working oil supply pressure is set lower than that of a conventional device, and pressure resistance in the cover member and the members constituting the converter mechanism can be secured easily.

Note that when the outlet passage includes a passage constituted by a recessed groove formed in the back surface of the holding member, which is provided on a side face of the stator for holding the thrust bearing, so as to extend radially on a side face of the stator, the working fluid can be caused to flow smoothly in the diametrical direction and the outlet passage can be formed without increasing the size of the fluid transmission device in the axial direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
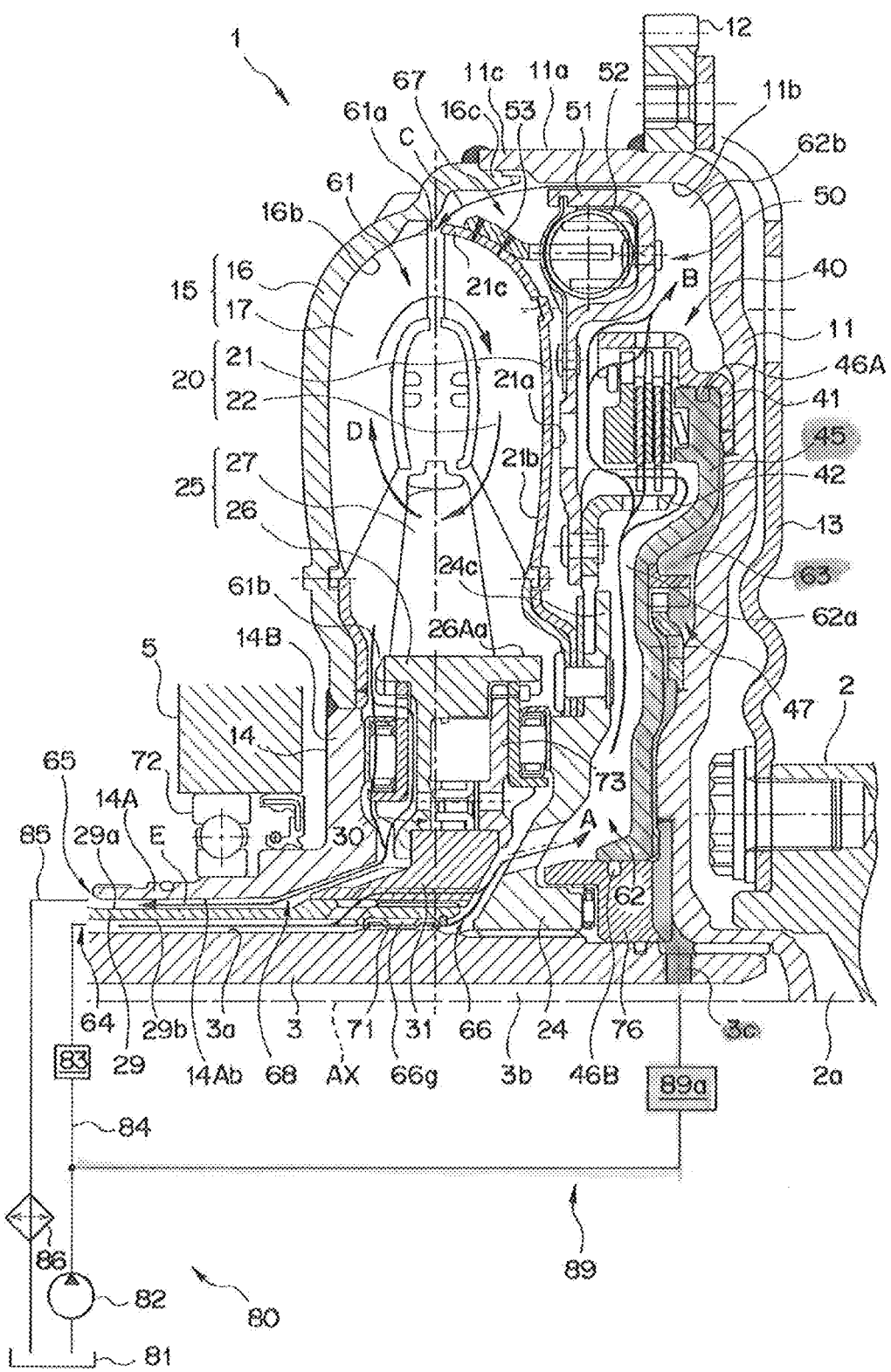
FIG. 1 is a sectional view of a torque converter serving as an embodiment of a fluid transmission device according to the present invention.

A preferred embodiment of the present invention will be described below with reference to the drawings. FIG. 1 is a sectional view of a torque converter 1 installed in a power unit of a vehicle, serving as an example of the fluid transmission device according to the present invention. Note that an engine and an automatic transmission, not shown in the drawing, are provided in the power unit on either side of the torque converter 1 in an axial direction, and in the following description, an axial end side relative to the torque converter 1 on which the engine is disposed will be referred to as the right side in accordance with the paper surface direction of FIG. 1, and the other axial end side relative to the torque converter 1 on which the automatic transmission is disposed will be referred to as the left side in accordance with the paper surface direction of FIG. 1.

The torque converter 1 is provided between an output shaft 2 of the engine and an input shaft 3 of the automatic transmission, which are disposed on an identical axis AX, and comprises a front cover 11 connected to the engine output shaft 2, and a converter mechanism for effecting power transmission from the engine output shaft 2 to the transmission input shaft 3 via working oil. The converter mechanism comprises a pump impeller 15 coupled to the front cover 11, a turbine runner 20 connected to the transmission input shaft 3, which opposes the pump impeller 15 axially and is covered by the front cover 11, and a stator 25 provided between the pump impeller 15 and the turbine runner 20.

The front cover 11 is formed in a bowl shape, press-fitted into and supported by a recessed portion 2*a* formed in a left end central portion of the engine output shaft 2, and supports a right end portion of the transmission input shaft 3 so as to be free to rotate relative thereto. A starting gear 12 to which power is transmitted from a starting motor, not shown in the drawing, that is activated during engine startup is welded to an outer peripheral surface 11*a* of the front cover 11, and a disc-shaped drive plate 13 fastened to the engine output shaft 2 is coupled to the starting gear 12. The front cover 11 is connected to the engine output shaft 2 via the starting gear 12 and the drive plate 13.

The pump impeller 15 comprises a pump shell 16 formed in a bowl shape and disposed axially opposite the front cover 11, and a plurality of pump blades 17 provided on an inner peripheral surface 16*b* of the pump shell 16. The front cover 11 and the pump shell 16 are fitted together at respective open edge portions 11*c*, 16*c* thereof and welded together at the resulting fitted part.

The turbine runner 20 comprises a turbine shell 21 formed in a bowl shape, which opposes the pump shell 16 axially and is covered by the front cover 11, and a plurality of turbine blades 22 fixed to an inner peripheral surface 21*b* of the turbine shell 21. The turbine shell 21 is riveted to an outer peripheral edge portion 24*c* of a disc-shaped turbine runner boss 24 that is spline-fitted to an outer peripheral surface 3*a* of the transmission input shaft 3. The turbine runner 20 is connected to the transmission input shaft 3 via the turbine runner boss 24.

The stator 25 is provided on a hollow cylindrical stator shaft 29, which is provided on an outer peripheral side of the transmission input shaft 3, via a one-way clutch 30, and is supported on the outer peripheral side of the transmission input shaft 3 by the stator shaft 29 and the one-way clutch 30. The stator 25 comprises a stator ring 26 for holding the one-way clutch 30, and a stator blade 27 provided so as to extend radially from an outer peripheral surface 26Aa of the stator ring 26 and disposed between the pump blades 17 and turbine blades 22. Note that the stator shaft 29 is a fixed shaft that is fastened to a transmission case 5 housing the automatic transmission on a left end portion thereof, not shown in the drawing. A bearing 71 is provided in a space 66*g* formed between a right end portion inner peripheral surface 29*b* of the stator shaft 29 and the outer peripheral surface 3*a* of the transmission input shaft 3, and by means of the bearing 71, the transmission input shaft 3 and stator shaft 29 are mutually supported.

A pump drive shaft 14 coupled to the pump shell 16 is provided rotatably on the outer peripheral side of the stator shaft 29. The pump drive shaft 14 comprises a hollow cylindrical boss portion 14A supported rotatably on the transmission case 5 via a bearing 72 and disposed on the outer peripheral side of the stator shaft 29, and a flange portion 14B that extends from a right end portion of the boss portion 14A to the outer peripheral side thereof and is welded to the pump shell 16. A pump driving chain wheel, not shown in the drawing, is coupled to a left end portion of the boss portion 14A, and the pump driving chain wheel is connected to a pump driven chain wheel, which is coupled to a rotor shaft of an oil pump 82 provided in a working oil supply device 80 to be described below, via a chain. Thus, when the pump drive shaft 14 rotates, the oil pump 82 is driven.

In the torque converter 1 described above, the front cover 11, pump impeller 15, and pump drive shaft 14 rotate integrally with the engine output shaft 2, the turbine runner 20 rotates integrally with the transmission input shaft 3, and the stator 25 is permitted to rotate in only one direction by the action of the one-way clutch 30. A donut-shaped converter chamber 61 is formed in the interior of the converter mechanism so as to be surrounded by the inner peripheral surface 16*b* of the pump shell 16, the inner peripheral surface 21*b* of the turbine shell 21, and the outer peripheral surface 26Aa of the stator ring 26. The interior of the converter chamber 61 is provided with the pump blades 17, the turbine blades 22 and the stator blade 27, and filled with working oil supplied by the working oil supply device 80.

When the engine is activated such that the engine output shaft 2 is driven to rotate, the front cover 11 is driven to rotate, and hence the pump shell 16 rotates. As a result, working oil flows into the converter chamber 61 in the direction indicated by an arrow D due to the action of the vanes of the pump blades 17, and the dynamic pressure of the flowing working oil acts on the turbine blades 22 such that the turbine shell 21 is driven to rotate. The rotation of the turbine shell 21 is transmitted to the turbine runner boss 24, whereby the transmission input shaft 3 is driven to rotate. At this time, a conversion action of the flow of working oil generated by the stator blade 27 is received, and power transmission is performed while increasing the torque. Hence, in the torque converter 1, the front cover 11 functions as an input member relative to the converter mechanism and the turbine runner boss 24 functions as an output member relative to the converter mechanism.

Figure 2:
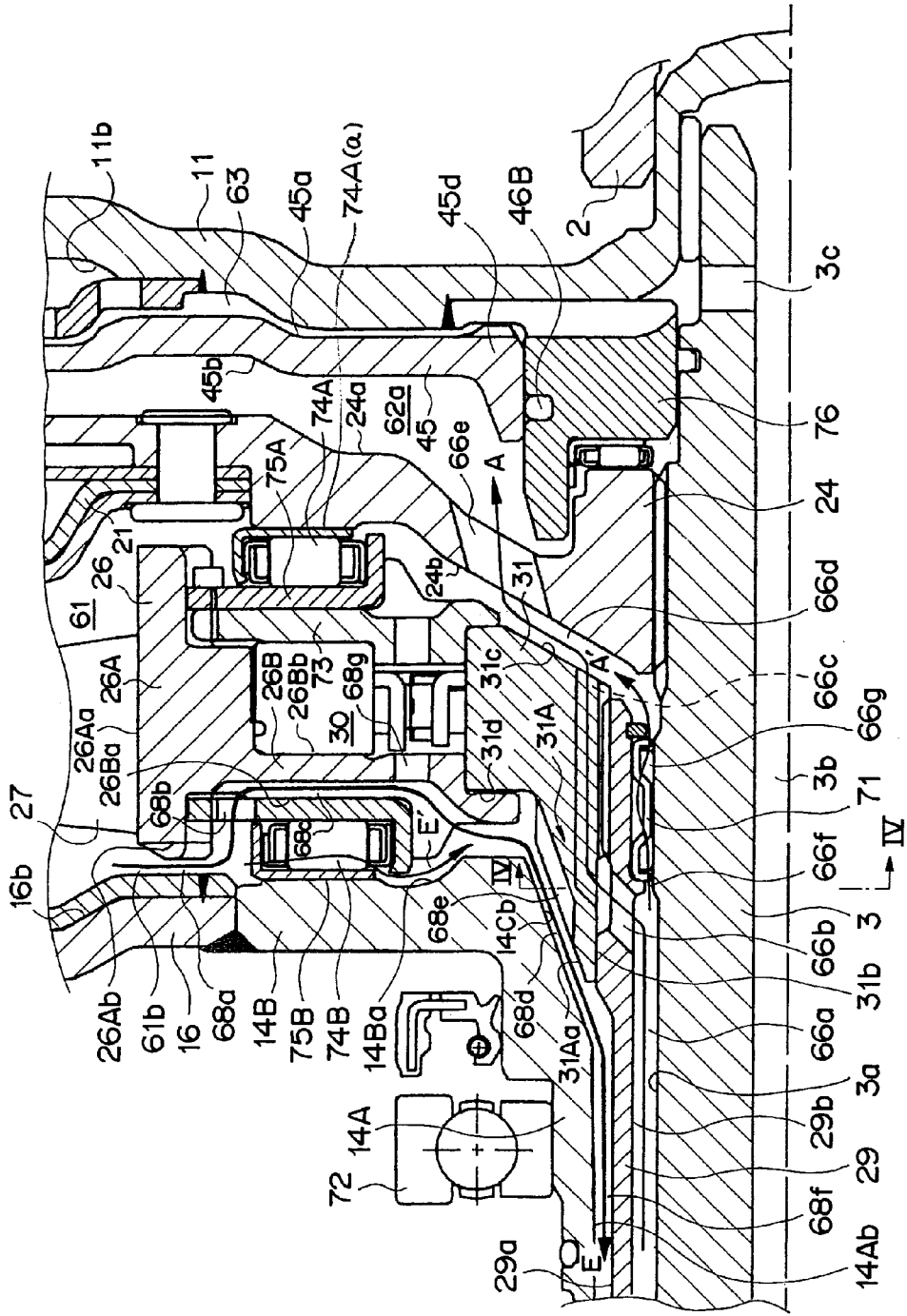
FIG. 2 is a partially enlarged view of FIG. 1.

As shown in FIG. 2, which is an enlargement of FIG. 1, the stator 26 and one-way clutch 30 are provided in a space surrounded by a right side surface 14Ba of the flange portion 14B of the pump drive shaft 14 and a left side surface 24*b* of the turbine runner hub 24.

The stator ring 26 comprises an outer peripheral wall portion 26A forming the aforementioned outer peripheral surface 26Aa and a left side wall portion 26B formed in a ring shape and extending from the outer peripheral wall portion 26A to the inner peripheral side, and is open on the right side. The open part is used to insert the one-way clutch 30 into the inner peripheral surface side of the outer peripheral wall portion 26A, and a back plate 73 is attached to the stator ring 26 so as to cover the open part. The one-way clutch 30 is sandwiched axially by an inner periphery 26Bb of the left side wall portion 26B of the stator ring 26 and an inner periphery of the back plate 73.

A hub side thrust bearing 74A is provided between the stator ring 26 and the turbine runner hub 24, and a pump side thrust bearing 74B is provided between the stator ring 26 and the flange portion 14B. Thus, the turbine runner hub 24, stator ring 26 and pump drive shaft 14 are supported to be free to rotate relative to each other. A hub side bearing holder 75A for holding the hub side thrust bearing 74A is attached tightly to the outer periphery of the back plate 73. The hub side thrust bearing 74A is provided with a cover 74A(a) covering the right side surface and upper surface thereof such that the flow of working oil through this part is restricted or stopped. Further, a pump side bearing holder 75B for holding the pump side thrust bearing 74B is attached tightly to an outer periphery 26Ba of the left side wall portion 26B of the stator ring 26.

The one-way clutch 30 comprises an inner ring 31 fixed on the stator shaft 29. A projecting portion 31A extending conically along an inner periphery 14Cb of a part that serves as a connecting seam between the boss portion 14A and flange portion 14B of the pump drive shaft 14 is formed integrally with a left side surface 31*d* of the inner ring 31 so as to project leftward from the left side wall portion 26B of the stator ring 26. An outer peripheral surface 31Aa of the projecting portion 31A forms a tapered surface that inclines leftward toward the inner peripheral side. The inner ring 31 is spline-fitted to the stator shaft 29 at a right end portion thereof, fitted tightly to the stator shaft 29 at a left end portion thereof, and thereby fixed onto the stator shaft 29 axially and circumferentially.

Power transmission employing the converter mechanism described above uses the kinetic energy of the internal working oil, and since power transmission loss occurs, increases in the temperature of the working oil are unavoidable. Hence, in the torque converter 1, the front cover 11 functioning as an input member relative to the converter mechanism and the turbine runner boss 24 functioning as an output member relative to the converter mechanism are engaged and disengaged (in other words, the engine output shaft 2 and transmission input shaft 3 are engaged and disengaged) under a fixed condition (when a rotation speed ratio of the pump impeller 15 and the turbine runner 20 is in the vicinity of 1.0), and a lockup mechanism 40 is provided to effect power transmission between the two shafts 2, 3 bypassing the converter mechanism when the front cover 11 and turbine runner boss 24 are engaged. The lockup mechanism 40 is disposed in a lockup chamber 62 formed so as to be surrounded by an outer peripheral surface (back surface) 21a of the turbine shell 21 and an inner peripheral surface 11b of the front cover 11.

Figure 3:
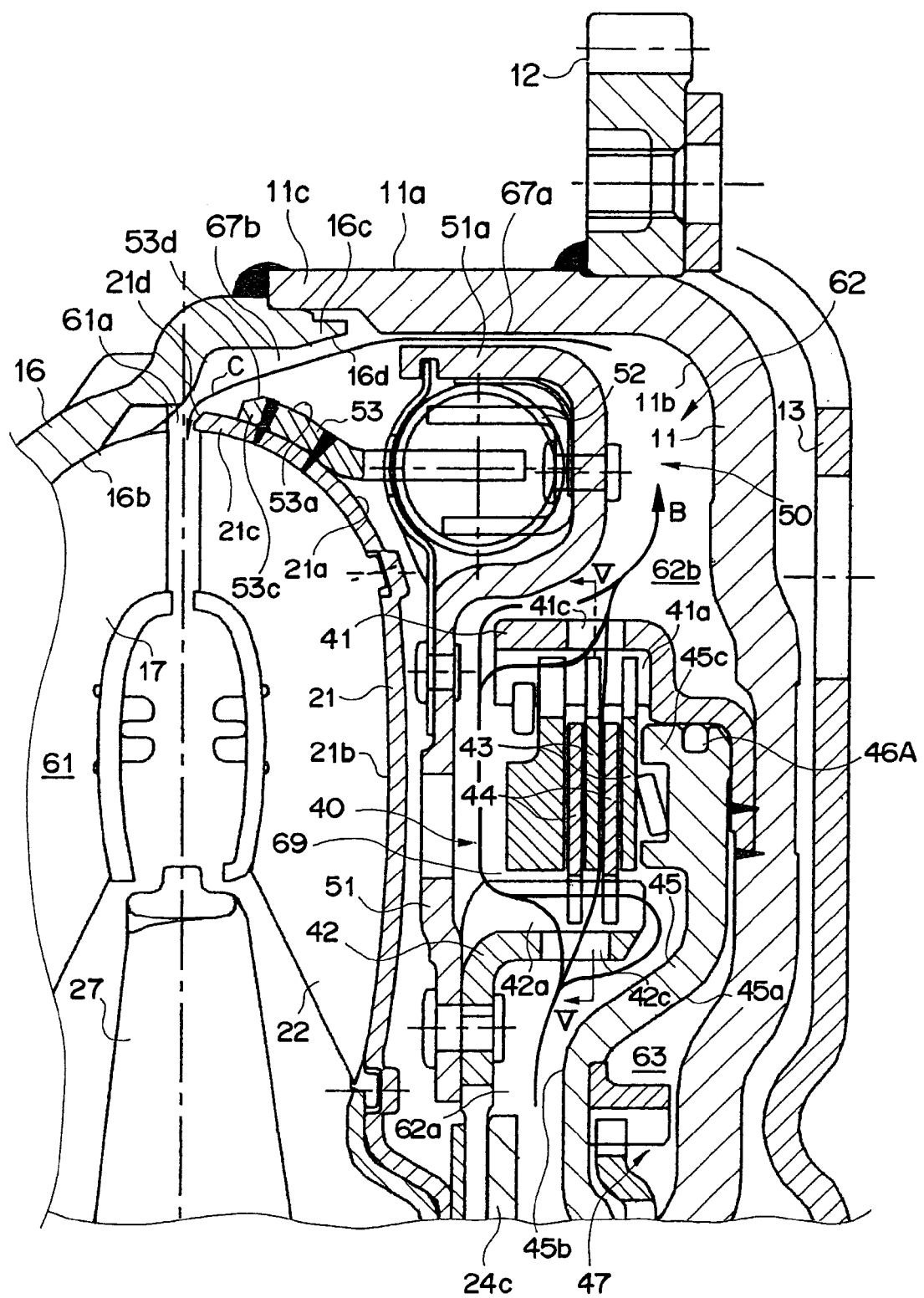
FIG. 3 is a partially enlarged view of FIG. 1.

As shown in FIG. 3, which is an enlargement of FIG. 1, the lockup mechanism 40 is a multiple disc clutch mechanism comprising a cylindrical clutch guide 41 joined to the inner peripheral surface 11b of the front cover 11, a cylindrical clutch hub 42 disposed on an inner peripheral side of the clutch guide 41 and supported on an outer peripheral edge portion 24c of the turbine runner hub 24, a plurality of clutch plates 43 provided to be free to slide axially in a clutch space 69 formed in donut shape and surrounded by the clutch guide 41 and clutch hub 42, and having outer peripheral edges that are spline-fitted into tooth-shaped spline grooves 41a formed in the clutch guide 41, a plurality of disc plates 44 provided to be free to slide axially in the clutch space 69 and having inner peripheral edges that are spline-fitted into tooth-shaped spline grooves 42a formed in the clutch hub 42, and a clutch piston 45 provided on the transmission input shaft 3 via an inner race 76.

The clutch plates 43 and disc plates 44 are provided alternately in the axial direction within the clutch space 69. The clutch piston 45 is formed in a disc shape, and has an outer peripheral edge portion 45c that is fitted to an inner peripheral surface of the clutch guide 41 (see FIG. 3) and an inner peripheral edge portion 45d that is fitted to an outer peripheral surface of the inner race 76 (see FIG. 2). Further, the clutch piston 45 is attached to the top of the inner race 76 on the inner peripheral side of the clutch guide 41 so as to be free to slide axially.

When the clutch guide 41, clutch hub 42 and clutch piston 45 are assembled in this manner, the lockup chamber 62 is partitioned radially into two spaces via the clutch space 69, namely an inner peripheral side space 62a surrounded by an inner peripheral surface of the clutch hub 42, a left side surface 45b of the clutch piston 45 and a right side surface 24a of the turbine runner hub 24, and an outer peripheral side space 62b surrounded by the outer peripheral surface of the clutch guide 41, the inner peripheral surface 11b of the front cover 11 and the outer peripheral surface 21a of the turbine shell 21. Furthermore, a clutch oil chamber 63 is formed so as to be surrounded by a right side surface (back surface) 45a of the clutch piston 45 and the inner peripheral surface 11b of the front cover 11. The clutch oil chamber 63 and the inner peripheral side space 62a are formed in axial direction series via the clutch piston 45 and sealed from each other by O-rings 46A, 46B provided respectively between the outer peripheral edge portion 45c of the clutch piston 45 and the clutch guide 41, and the inner peripheral edge portion 45d of the clutch piston 45 and the inner race 76. Thus, the clutch oil chamber 63 is formed independently of the inner peripheral side space 62a. Note that a fitting portion 47 constituted by a disc-shaped inside fitting portion welded to the inner peripheral surface 11b of the front cover 11 and a disc-shaped outside fitting portion provided on the right side surface 45a of the clutch piston 45 and spline-fitted to the inside fitting portion is provided in the clutch oil chamber 63.

By means of this fitting portion 47, movement of the clutch piston 45 is guided axially, and the clutch piston 45 is reliably rotated integrally with the front cover 11. Thus, slippage between the outer peripheral edge portion 45c of the clutch piston 45 and the clutch plates 43 is suppressed.

The lockup mechanism 40 is also provided with a damper mechanism 50. The damper mechanism 50 comprises a disc-shaped damper plate 51 coupled to the clutch hub 42 and extending radially along the left side of the lockup mechanism 40 within the outer peripheral side space 62a in the lockup chamber 62, a coil spring 52 held on an outer peripheral edge portion 51a of the damper plate 51, and a rib 53 connected to the coil spring 52 and welded to the outer peripheral surface 21a of the turbine shell 21. Thus, the clutch hub 42 is coupled to the turbine runner 20 via the damper mechanism 50.

A constitution for supplying working oil to the torque converter 1 from the outside will now be described. As shown in FIG. 1, in the torque converter 1, an oil inlet 64 for introducing working oil from the outside is formed between the outer peripheral surface 3a of the transmission input shaft 3 and the inner peripheral surface 29b of the stator shaft 29, and an oil outlet 65 for discharging the working oil to the outside is formed between the outer peripheral surface 29a of the stator shaft 29 and an inner peripheral surface 14Ab of the boss portion 14A of the pump drive shaft 14. As shown by arrows A to E, an internal passage for leading the working oil that flows through the oil inlet 64 to the converter chamber 61 through the lockup chamber 62 (the inner peripheral side space 62a and outer peripheral side space 62b) and then to the oil outlet 65 from the converter chamber 61 is formed in the interior of the torque converter 1, as will be described in detail below. Further, the transmission input shaft 3 is formed with an oil passage 3b that extends axially through the central portion thereof, and an oil passage 3c that extends radially so as to communicate with the oil passage 3b and opens into the clutch oil chamber 63 on the outer peripheral surface 3a.

A working oil supply device 80 for supplying and discharging the working oil is provided in the vehicle on the exterior of the torque converter 1. The working oil supply device 80 comprises an oil pump 82 that is driven by the pump drive shaft 14 (in other words, the engine output shaft 2) to pump working oil stored in an oil pan 81, a converter supply oil passage 84 for supplying the working oil discharged by the oil pump 82 to the oil inlet 64, a converter discharge oil passage 85 for leading working oil discharged through the oil outlet 65 to the oil pan 81, a converter control valve 83 for adjusting the pressure of the working oil flowing through the converter supply oil passage 84 to a predetermined converter internal pressure, and an oil cooler 86 provided on the converter discharge oil passage 85 for cooling the working oil. Thus, working oil discharged through the oil outlet 65 passes through the oil cooler 86 while returning to the oil pan 81 and is cooled thereby, whereupon the cooled working oil is discharged by the oil pump 82 and supplied to the oil inlet 64. The working oil supply device 80 further comprises a clutch supply/discharge portion 89 for supplying and discharging working oil to and from the clutch oil chamber 63 (oil passage 3b), and the clutch supply/discharge portion 89 comprises a clutch control valve 89a for performing variable adjustment control to set the pressure of the working oil in the clutch oil chamber 63 to a lockup control pressure. The vehicle is also provided with a lockup control device (not shown) for performing operation control on the clutch control valve 89a on the basis of operating conditions, such as the vehicle speed, detected by sensors disposed in each portion, and thereby performing adjustment control of the lockup control pressure.

In the lockup mechanism 40 described above, the clutch piston 45 moves axially in accordance with a differential pressure between the pressure (converter internal pressure) of the working oil that is supplied to the inner peripheral side space 62a, which is substantially fixed at all times, and the pressure (lockup control pressure) of the working oil that is supplied to the clutch oil chamber 63, which is variable, and thus the clutch plates 43 and disc plates 44 are engaged and disengaged. In other words, engagement control of the lockup mechanism 40 is performed through adjustment control of the lockup control pressure by the lockup control device. When the lockup control pressure is set low, the clutch piston 45 moves to the right side such that the clutch plates 43 and disc plates 44 are removed from each other. When the lockup mechanism 40 is in this released state, power transmission is performed via the converter mechanism in the manner described above, whereby the transmission input shaft 3 is driven to rotate. When the lockup control pressure is set high, on the other hand, the clutch piston 45 moves to the left side, whereby the clutch plates 43 are pushed axially such that the clutch plates 43 and disc plates 44 are engaged. When the lockup mechanism 40 is in this engaged state, the rotational drive force of the front cover 11 is transmitted to the turbine runner hub 24 via the clutch guide 41, clutch plates 43, disc plates 44 and clutch hub 42. As a result, the engine output shaft 2 and transmission input shaft 3 are directly coupled such that power transmission bypassing the converter mechanism is performed.

Note that since the damper mechanism 50 is provided between the clutch hub 42 and the turbine shell 21 coupled to the turbine runner hub 24, the input of an excessive load to the transmission input shaft 3 side can be prevented even when the lockup mechanism 40 suddenly shifts from a released state to an engaged state, and therefore the vehicle can travel with stability. Further, the lockup control device performs control to cause the lockup mechanism 40 to slide (prevent the lockup mechanism 40 from entering a completely engaged state) in accordance with operating conditions, and by means of this sliding control, power transmission is performed in accordance with the operating conditions, enabling an improvement in fuel economy. Note, however, that when sliding control is performed, the amount of heat generated by the clutch plates 43 and disc plates 44 increases due to friction, and this may affect the durability of the lockup mechanism 40. Hence, in the torque converter 1, an internal passage is formed so that the lockup mechanism 40 can be cooled efficiently.

The structure of the internal passage in the torque converter 1 will be described below, assuming that the lockup mechanism 40 is in a released state. The internal passage includes an inlet passage 66 connecting the oil inlet 64 to the inner peripheral side space 62a of the lockup chamber 62, a communicating passage 67 connecting the outer peripheral side space 62b of the lockup chamber 62 to the converter chamber 61, and an outlet passage 68 connecting the converter chamber 61 to the oil outlet 65.

As shown in FIG. 2, the inlet passage 66 has a main route constituted by a passage 66a connected to the oil inlet 64 and formed to extend axially between the outer peripheral surface 3a of the transmission input shaft 3 and the inner peripheral surface 29b of the stator shaft 29, a passage 66b formed so as to penetrate the stator shaft 29 radially and communicate with the right portion of the passage 66a, a passage 66c formed so as to extend axially through the inner peripheral portion of the inner ring 31, a left end of which opens into an inner peripheral surface 31b of the inner ring 31 so as to communicate with the passage 66b and a right end of which opens into a right end surface 31c of the inner ring 31, a passage 66d that communicates with the passage 66c and is formed so as to extend radially while being surrounded by the right end surface 31c of the inner ring 31 and the left end surface 24b of the turbine runner hub 24, and a passage 66e formed so as to penetrate the turbine runner hub 24 and connect the passage 66d to the inner peripheral side space 62a of the lockup chamber 62. As shown by an arrow A, working oil from the oil inlet 64 travels along the main route in order of "66a→66b→66c→66d→66e", and is thus led into the inner peripheral side space 62a of the lockup chamber 62.

Figure 4:
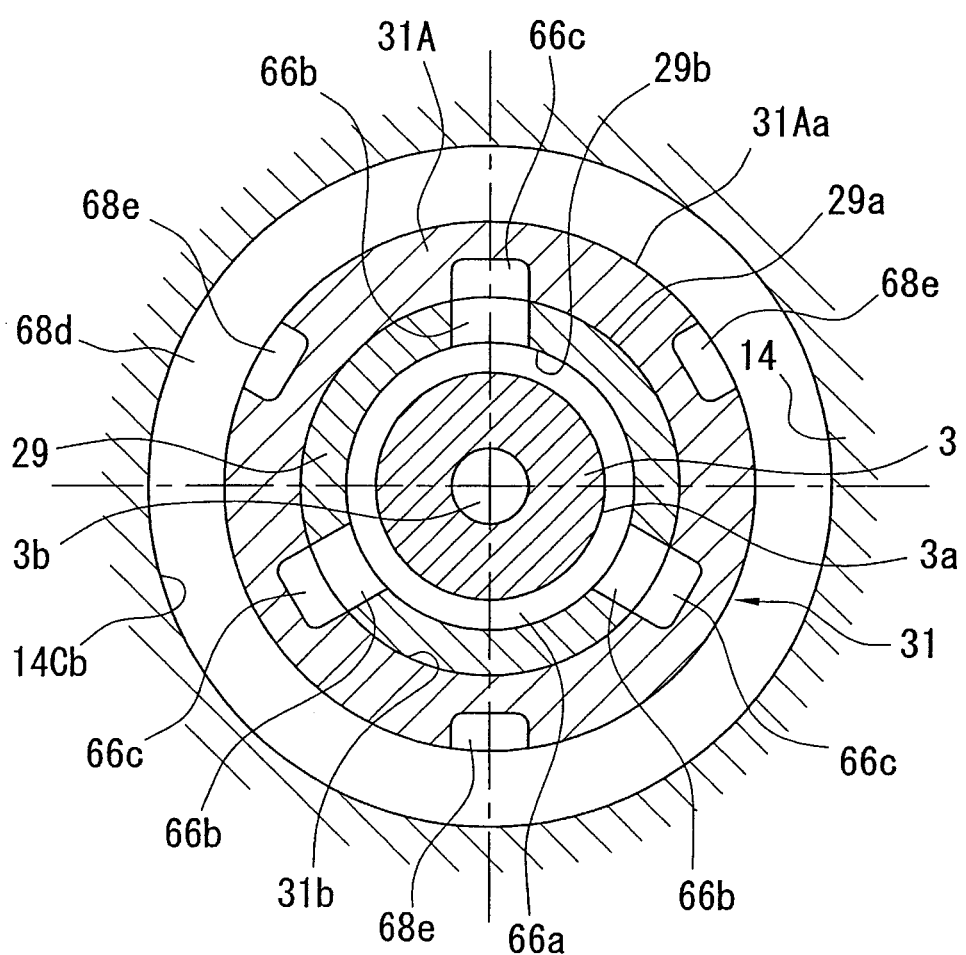
FIG. 4 is a sectional view of the torque converter along an arrow IV-IV in FIG. 2.

As shown in FIG. 4, the passages 66b, 66c are each formed in a plurality arranged in series at equal intervals in the circumferential direction, and therefore the working oil in the passage 66a flows smoothly into the passages 66b, 66c to be led into the passage 66d. Note that the passage 66b opens onto the part of the outer peripheral surface 29a of the stator shaft 29 that is fitted to the inner ring 31, while the passage 66c opens onto the part of the inner peripheral surface 31a of the inner ring 31 that is fitted to the stator shaft 29. To connect the two passages 66b, 66c to each other in this fitting part, the inner ring 31 and stator shaft 29 are provided with a predetermined positioning structure for spline-fitting the inner ring 31 and stator shaft 29 following positioning thereof in the circumferential direction.

Further, the back plate 73 is attached tightly to the stator ring 26, and the hub side bearing holder 75A is attached tightly to the outer periphery of the back plate 73. Thus, the outer peripheral side of the passage 66d is tightly sealed from the converter chamber 61 by these members 73, 75A. As a result, pressure loss in the working oil flowing through the passage 66d is reduced.

Note that the passage 66a communicates with a space 66g provided with the aforementioned bearing 71 through an orifice 66f, and the space 66g opens onto the right end of the stator shaft 29 so as to communicate with the passage 66d. Hence, the inlet passage 66 has a branch route constituted by the orifice 66f and the space 66g. Working oil in the passage 66a passes through the branch route in the manner shown by an arrow A', is used to lubricate the bearing 71, and then merges with the working oil in the passage 66d of the main route. The flow rate of the working oil in the branch route is restricted by the orifice 66f, enabling a reduction in pressure loss in the working oil on the main route.

Figure 5:
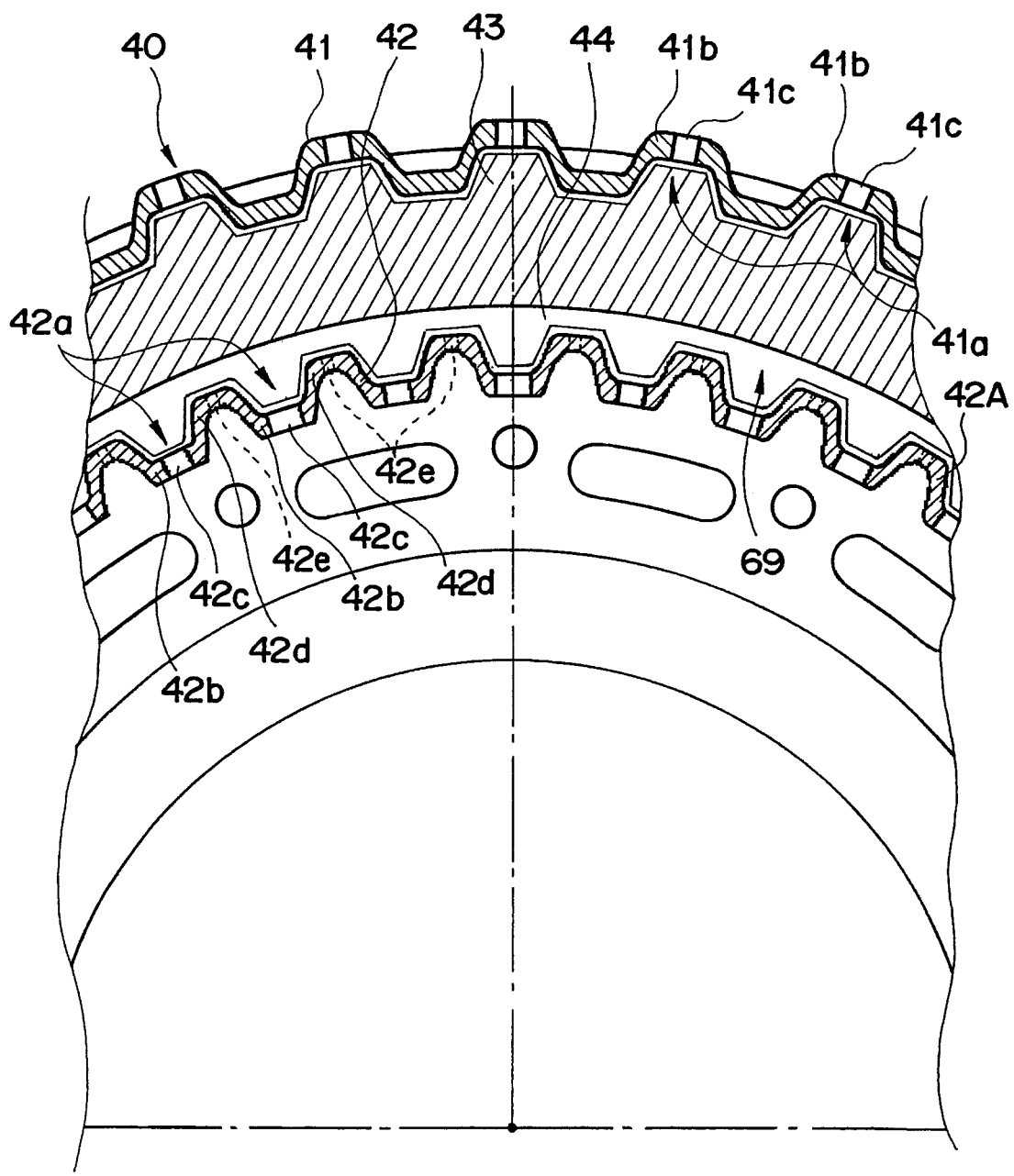
FIG. 5 is a partial sectional view of a lockup mechanism along an arrow V-V in FIG. 3.

Next, the flow of the working oil through the lockup chamber 62 will be described. As described above, the lockup chamber 62 is partitioned into the inner peripheral side space 62a and the outer peripheral side space 62b via the clutch space 69. As shown in FIGS. 3 and 5, the clutch hub 42 is formed with a first hub side through hole 42c that radially penetrates a tooth tip portion 42b forming a small diameter side surface in an outer peripheral portion 42A formed with a spline groove 42a and a second hub side through hole 42e that radially penetrates a tooth base portion 42d forming a large diameter side surface in the outer peripheral portion 42A, and by means of the first and second hub side through holes 42c, 42e, the inner peripheral side space 62a and the clutch space 69 communicate with each other. The inner peripheral side space 62a and the clutch space 69 also communicate with each other via a gap between the right end of the clutch guide 41* and the left end surface 45b of the clutch piston 45, and the hub side spline groove 42a opens onto this gap at a right end portion thereof.

Meanwhile, the clutch guide 41 is formed with a guide side through hole 41c that radially penetrates a tooth base portion 41b forming a large diameter side surface of the spline groove 41a, and by means of this guide side through hole 41c, the clutch space 69 and the outer peripheral side space 62b communicate with each other. The clutch space 69 and the outer peripheral side space 62b also communicate with each other via a gap between the left end portion of the clutch guide 41 and the right end surface of the damper plate 51, and the guide side spline groove 41a opens onto this gap at a left end portion thereof.

Hence, as shown by an arrow B, the working oil that flows into the inner peripheral side space 62a of the lockup chamber 62 through the inlet passage 66 flows toward the outer peripheral side while receiving the effect of a centrifugal force generated as the torque converter 1 rotates, and is led to the outer peripheral side space 62b through the clutch space 69. Note that although the lockup control pressure for activating the clutch piston 45 is supplied to the clutch oil chamber 63, the clutch oil chamber 63 is independent of the lockup chamber 62, and therefore a unidirectional flow is formed in the lockup chamber 62 from the inner peripheral side space 62a with which the inlet passage 66* communicates toward the outer peripheral side, irrespective of the set lockup control pressure, the state of working oil supply/discharge relative to the clutch oil chamber 63, the operational state of the clutch piston 45, and the engagement state of the plates 43, 44.

When the lockup mechanism 40 is in a released state, the working oil that flows into the inner peripheral side space 62a is led into the hub side spline groove 42a in the clutch space 69 through the first hub side through hole 42c and the gap between the clutch hub 42 and clutch piston 45, and is used for lubrication between the clutch hub 42 and disc plates 44. The working oil in the hub side spline groove 42a flows through the cutch space 69 between adjacent disc plates 44, 44 toward the outer peripheral side, and also flows from the left end portion of the hub side spline groove 42a along the right side surface of the damper plate 51 on the left outer side of the location of the plates 43, 44 in the clutch space 69 toward the outer peripheral side. The working oil that flows through the clutch space 69 along the right side surface of the damper plate 51 passes through the gap between the damper plate 51 and the clutch guide 41, flows into the outer peripheral side space 62b as is, and then flows into the guide side spline groove 41a to be used for lubrication between the clutch guide 41 and the clutch plates 43. Further, the working oil that flows into the inner peripheral side space 62a is led to the outer peripheral side of the hub side spline groove 42a through the second hub side through hole 42e, and together with the working oil that flows toward the outer peripheral side between adjacent disc plates 44, 44, flows toward the outer peripheral side between the separated clutch plates 43 and disc plates 44 and into the guide side spline groove 41a. During this process, heat exchange occurs between the opposing surfaces of the plates 43, 44 and the working oil, and as a result, the plates 43, 44 are cooled efficiently. The working oil used for lubrication in the guide side spline groove 41a is led to the outer peripheral side space 62b through the guide side through hole 41c.

Hence, by forming the first hub side through hole 42c in the tooth tip portion 42b of the clutch hub 42, the working oil in the inner peripheral side space 62a can be led smoothly into the hub side spline groove 42a, and lubrication between the clutch hub 42 and disc plates 44 can be performed efficiently.

Further, by forming the second hub side through hole 42e in the tooth base portion 42d of the clutch hub 42, the working oil in the inner peripheral side space 62a can be led smoothly to the outer peripheral side of the hub side spline groove 42a in the clutch space 69, and when the lockup mechanism 40 is in a released state, the working oil can be supplied directly between the clutch plates 43 and disc plates 44 without passing through the hub side spline groove 42a, whereby the plates 43, 44 can be cooled efficiently. Further, by forming the guide side through hole 41c in the tooth base portion 41b of the clutch guide 41, the working oil that flows through the clutch space 69 can be led to the outer peripheral side space 62b after being led into the guide side spline groove 41a, and hence lubrication between the clutch guide 41 and the clutch plates 43 can be performed efficiently by the working oil in the clutch space 69.

As shown in FIG. 3, the communicating passage 67 includes a passage 67a connected to the outer peripheral side space 62b and formed between the inner peripheral surface 11b of the front cover 11 and the outer peripheral edge portion 51a of the damper plate 51, and a passage 67b that communicates with a left end of the passage 67a and is surrounded by the inner peripheral surface 16b of the open edge portion 16c of the pump shell 16, the outer peripheral surface 21a of the open edge portion 21c of the turbine shell 21, and an outer peripheral surface 53a of the rib 53 of the damper mechanism 50. The open edge portion 21c of the turbine shell 21 is provided so as to project leftward from an edge portion 53c of the rib 53 of the damper mechanism 50, and the passage 67b is connected to the converter chamber 61 through a gap (converter chamber inlet) 61a formed between the open edge portion 21c of the turbine shell 21 projecting in this manner and the inner peripheral surface 16b of the pump shell 16. Thus, the working oil that flows into the outer peripheral side space 62b is led to the converter chamber inlet 61a through the communicating passage 67 in order of "67a→67b", as shown by an arrow C, and is then led into the converter chamber 61 through the converter chamber inlet 61a.

Note that in the passage 67b, the working oil flows leftward and toward the inner peripheral side in accordance with the positional relationship between the left end of the passage 67a and the converter chamber inlet 61a. Here, the open edge portion 16c of the pump shell 16 is chamfered on an inner peripheral side forming the passage 67b such that a tapered surface 16d that inclines leftward toward the inner peripheral side is formed on the inner peripheral surface 16b of the open edge portion 16c. The edge portion 53c of the rib 53 is chamfered on an outer peripheral side forming the passage 67b such that a tapered surface 53d that inclines leftward toward the inner peripheral side is formed on the outer peripheral surface 53a of the edge portion 53c. Further, the open edge portion 21c of the turbine shell 21 is chamfered on an outer peripheral side forming the passage 67b such that a tapered surface 21d that inclines leftward toward the inner peripheral side is formed on the outer peripheral surface 21a of the open edge portion 21c of the turbine shell 21. Hence, the working oil that flows into the passage 67b flows smoothly leftward and to the inner peripheral side along the tapered surface 16d of the pump shell 16 and the tapered surface 53d of the rib 53, regardless of the centrifugal force action. Moreover, the working oil flows smoothly to the converter chamber inlet 61a along the tapered surface 21d of the turbine shell 21 and is led therefrom into the converter chamber 61.

The working oil that flows into the converter chamber 61 flows in the direction of the arrow D, as described above, thereby causing the turbine runner 20 to rotate, and as the turbine runner 20 rotates, the temperature of the working oil rises. The working oil then passes through a gap (converter chamber outlet) 61b formed between the inner peripheral surface 16b of the pump shell 16 and the outer peripheral wall portion 26A of the stator ring 26 and is discharged to the exterior of the converter chamber 61.

As shown in FIG. 2, the outlet passage 68 has a main route constituted by a passage 68a connected to the converter chamber outlet 61b, which extends radially and is surrounded by a left side surface 26Ab of the outer peripheral wall portion 26A of the stator ring 26 and the inner peripheral surface 16b of the pump shell 16, a passage 68b formed in the pump side bearing holder 75B so as to penetrate to the outer peripheral side of the pump side thrust bearing 74B, a passage 68c constituted by a recessed groove formed in an outer surface 26Ba of the left side wall portion 26B of the stator ring 26 so as to extend radially, which is covered by the pump side bearing holder 75B attached tightly to the outer surface 26Ba, a passage 68d surrounded by an outer peripheral surface 31Aa of the projecting portion 31A of the inner ring 31 and an inner surface 14Cb of the pump drive shaft 14 so as to communicate with a diametrical direction inner peripheral side of the passage 68c, a passage 68e that is formed in a recessed groove form in the outer peripheral surface 31Aa of the projecting portion 31A of the inner ring 31 so as to extend in a bus direction and opens into the passage 68d, and a passage 68f that is connected to the passages 68d, 68e, formed so as to extend axially between the outer peripheral surface 29a of the stator shaft 29 and the inner peripheral surface 14Ab of the boss portion 14A of the pump drive shaft 14, and connected to the oil outlet 65 at a left end portion.

As shown by an arrow E, the working oil that passes through the converter chamber outlet 61b travels along the main route of the outlet passage 68 in order of "68a→68b→68c→68d→68e→68f", and is thus led to the oil outlet 65.

Figure 6:
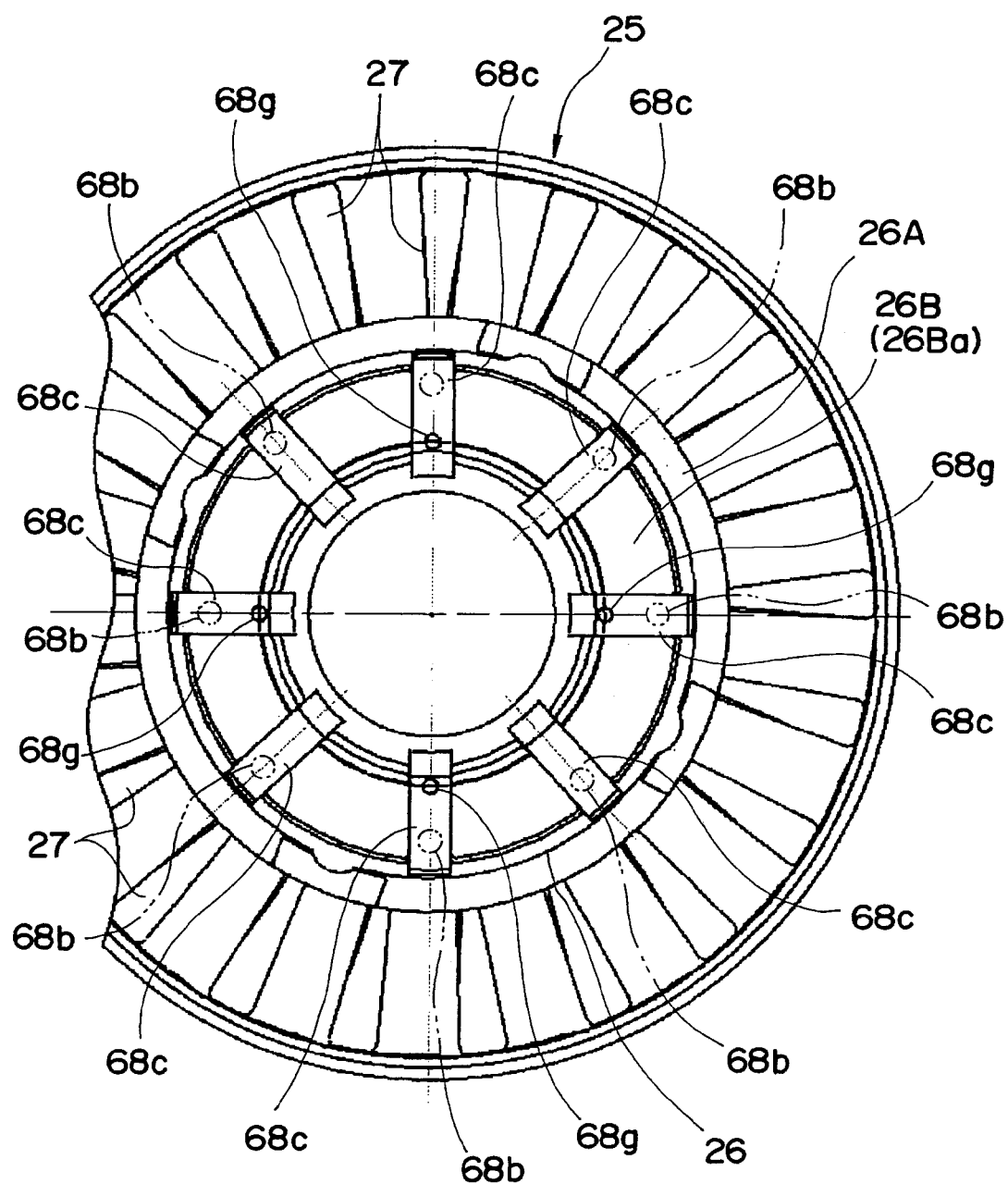
FIG. 6 is a left side face view of a stator.

As shown in FIG. 6, the passages 68b, 68c are each formed in a plurality arranged in series at equal intervals in the circumferential direction (in other words, a plurality of recessed grooves is formed in the outer surface 26Ba), and therefore the working oil in the passage 68a flows smoothly into the passages 68b, 68c to be led into the passages 68d, 68e. By providing the outlet passage 68 with the passage 68c covering the recessed grooves formed in the stator rig 26 so as to extend radially, the outlet passage 68 can be formed without increasing the axial direction size of the torque converter 1.

Further, by forming the passage 68e that opens into the passage 68d in the outer peripheral surface 31Aa of the inner ring 31, the passage 68d is partially widened such that the working oil in the passage 68c is led to the passage 68f smoothly even though the passage 68d is narrow, and thus the outlet passage 68 can be formed without increasing the size of the torque converter 1. Further, as shown in FIG. 4, the passage 68e is formed in a plurality arranged in series at equal intervals in the circumferential direction, and as a result the working oil in the passage 68c flows smoothly into the passage 68e to be led to the passage 68f.

A plurality of the passages 66c forming the inlet passage 66 are formed in the inner ring 31 by cutting notches in the inner peripheral surface 31b on the outer peripheral side, and a plurality of the passages 68e forming the outlet passage 68 are formed in the inner ring 31 by cutting notches in the outer peripheral surface 31Aa on the inner peripheral side. However, the passage 66c and the passage 68e are formed in different circumferential direction positions (phases) to each other. When the passages 66c, 68e are formed in the same position in the circumferential direction, sufficient thickness must be set to secure rigidity between a bottom surface portion of the passage 66c and a bottom surface portion of the passage 68e. In this embodiment, the positions of the bottom surface portions of the passages 66c, 68e are removed from each other in the circumferential direction, and therefore rigidity need only be secured in the thickness between the bottom surface portion of the passage 66c and the outer peripheral surface 31Aa and the thickness between the bottom surface portion of the passage 68e and the inner peripheral surface 31b. Hence, when forming the groove-shaped passage in both the inner peripheral surface 31b and outer peripheral surface 31Aa of the inner ring 31, size increases in the diametrical direction can be avoided while securing rigidity in the inner ring 31.

As shown by an arrow E', the outlet passage 68 has a branch route in which the working oil in the passage 68a passes through the interior of the pump side thrust bearing 74B, is used for lubrication, and then merges with the working oil in the passages 68d, 68e. Further, a through hole 68g that axially penetrates the recessed groove forming the passage 68c is formed in the left side wall portion 26B of the stator ring 26 such that the working oil flowing through the passage 68c is supplied to a space surrounded by the stator ring 26 and the back plate 73 through the through hole 68g and is used to lubricate the one-way clutch 30. The working oil that passes through the outlet passage 68 is discharged to the exterior of the torque converter 1 through the oil outlet 65 and returned to the oil pan 81 by the converter discharge oil passage 85. During this process, the working oil passes through the oil cooler 86, and thus the working oil, which has risen in temperature due to heat exchange with the plates 43, 44 and passage through the converter chamber 61, is cooled. The cool returned working oil is discharged by the oil pump 82, led to the converter supply oil passage 84, adjusted in pressure to the converter internal pressure by the converter control valve 83, and introduced into the inlet passage 66 through the oil inlet 64. In this manner, the working oil is circulated.

Note that when the lockup mechanism 40 is in an engaged state, the spaces between the engaged clutch plates 43 and disc plates 44 are closed, and therefore the working oil that is discharged by the oil pump 82 and introduced into the inner peripheral side space 62a through the inlet passage 66 flows into the hub side spline groove 42a through the first hub side through hole 42c and the gap between the clutch hub 42 and clutch piston 45, flows through the clutch space 69 along the right side surface of the damper plate 51 toward the outer peripheral side, and passes through the gap between the clutch guide 41 and the damper plate 51. The working oil then flows through this gap straight into the outer peripheral side space 62b, or flows into the guide side spline groove 41a and then flows into the outer peripheral side space 62b through the guide side through hole 41c. Hence, even in the engaged state, the working oil flows into the spline grooves 41a, 42a to lubricate the clutch plates 43 and disc plates 44. Further, the working oil in the inner peripheral side space 62a flows around the plates 43, 44 in the clutch space 69 and is then led to the outer peripheral side space 62b, and therefore the lockup mechanism 40 is cooled, albeit with lower efficiency than in the released state. The working oil that passes through the communicating passage 67 from the outer peripheral side space 62b and is led into the converter chamber 61 through the converter chamber inlet 61a flows through the converter chamber 61 as shown by the arrow D, but since the lockup mechanism 40 is in an engaged state such that power transmission is not performed via the converter mechanism, the increase in the temperature of the working oil is small.

When the lockup mechanism 40 is in a state where slippage control is performed, the working oil flows into the lockup chamber 62 in a similar manner to the engaged state. In this state, the plates 43, 44 rub together, leading to an increase in the amount of generated heat, but since the working oil in the inner peripheral side space 62a passes over the periphery of the plates 43, 44 in the clutch chamber 69, the increase in the temperature of the lockup mechanism 40 is reduced. The working oil that passes through the communicating passage 67 from the outer peripheral side space 62b and is led into the converter chamber 61 through the converter chamber inlet 61a flows through the converter chamber 61 as shown by the arrow D, but since the rotation speed ratio of the pump impeller 15 and the turbine runner 20 is in the vicinity of 1.0 during slippage control, the temperature of the working oil does not increase greatly.

Further, in the engaged state or the state where slippage control is performed, similarly to the released state, the working oil is led to the converter discharge oil passage 85 through the oil outlet 65 after passing through the outlet passage 68 from the converter chamber outlet 61b, and is then cooled by the oil cooler 86 and returned to the oil pan 81.

In the torque converter 1 according to this embodiment, the lockup mechanism 40, which is constituted by a multiple disc clutch mechanism, is disposed within the lockup chamber 62, and cooled working oil discharged by the oil pump 82 is initially led to the lockup chamber 62 in the interior of the torque converter 1.

Since the cooled working oil is supplied directly, the cooling effect of the lockup mechanism 40 can be enhanced. When the cooling effect is enhanced, durability can be secured easily in the lockup mechanism 40 and slippage control can be performed safely in the lockup mechanism 40 with a higher frequency. As a result, engagement control of the lockup mechanism 40 can be performed in accordance with operating conditions, enabling an improvement in fuel economy.

Moreover, the inlet passage 66 is connected to the inner peripheral side space 62a of the lockup chamber 62, and the communicating passage 67 connected to the converter chamber 61 via the converter chamber inlet 61a* is connected to the outer peripheral side space 62b. Hence, the working oil flows through the lockup chamber 62 from the inner peripheral side to the outer peripheral side, but by employing the centrifugal force that accompanies rotation of the torque converter 1, the working oil can be caused to flow smoothly as an adjusted flow even when the converter internal pressure is set low.

As described above, the working oil also flows smoothly as an adjusted flow through the inlet passage 66, communicating passage 67 and outlet passage 68. When the working oil flows smoothly in this manner, pressure loss in the working oil pressure as the working oil flows through the internal passage can be reduced such that even when the converter internal pressure is set lower than that of a conventional device, the working oil can flow from the oil inlet 64 to the oil outlet 65. At the same time, the clutch piston 45 is moved in accordance with the differential pressure between the converter internal pressure and the lockup control pressure, and therefore the lockup control pressure can be set lower than that of a conventional device in accordance with the reduction in the converter internal pressure. As a result, pressure resistance can be secured easily in the front cover 11, pump drive shaft 14, pump shell 16, turbine shell 21, turbine runner hub 24, clutch piston 45 and so on, and therefore the plate thickness of these members can be reduced below that of a conventional device, for example, enabling reductions in the weight and size of the torque converter 1 and an improvement in the ease of installation in the vehicle. Furthermore, the discharge capacity of the oil pump 82 can be reduced, enabling a reduction in friction loss in the oil pump 82, which is driven through transmission of the rotational drive force of the engine output shaft 2, and an improvement in fuel economy.

An embodiment of the present invention was described above, but the scope of the present invention is not limited to the above constitution. For example, the number of passages 66c, 68e is not limited to the example shown in FIG. 4, and may be modified appropriately. Further, the passages 66c, 68e need not be formed in the same number, and similar effects to those of the embodiment described above are obtained when the passages 66c, 68e are formed in different numbers, as long as they can be formed at dislocated phases. Furthermore, a structure in which the stator 25 is supported by the stator shaft 29 and the one-way clutch 30 on the outer peripheral side of the transmission input shaft 3 was described above, but even when the one-way clutch is omitted to provide a torque converter in which the stator is fixed onto the stator shaft, similar effects to those of the embodiment described above are obtained by forming the passages 66c, 68e in the inner peripheral surface and outer peripheral surface of the stator shaft. Note that with this constitution, the positioning structure penetrating the passages 66b, 68c may be omitted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Related Applications

This application claims the priority of Japanese Patent Application No. 2007-011049 filed on Jan. 22, 2007, which is incorporated herein by reference.

What is claimed is:

1. A fluid transmission device, comprising:
a cover member coupled to a drive shaft;
a converter mechanism comprising
a pump impeller coupled to said cover member,
a turbine runner connected to a driven shaft, which opposes said pump impeller and is covered by said cover member, and
a stator disposed between said pump impeller and said turbine runner, for effecting power transmission between said drive shaft and said driven shaft via a working fluid that flows through a converter chamber formed internally;
a lockup mechanism having a clutch piston that is provided in a lockup chamber surrounded by said cover member and a back surface of said turbine runner, for activating said clutch piston using a control fluid that is supplied to a clutch oil chamber surrounded by said cover member and a back surface of said clutch piston, and effecting power transmission bypassing said converter mechanism by engaging and disengaging said drive shaft and said driven shaft;
an inlet passage for leading said working fluid into said lockup chamber from the outside;
a communicating passage for leading said working fluid into said converter chamber from said lockup chamber;
an outlet passage for leading said working fluid to the outside from said converter chamber;
a hollow cylindrical support member which is provided surrounding an outer peripheral surface of said driven shaft;
an inner ring which is fixedly mounted on said support member and supports said stator; and a bearing provided in a bearing providing space formed between an inner peripheral surface of said support member and an outer peripheral surface of said driven shaft, wherein said inlet passage comprises a main route and a branch route, said main route includes a first inlet passage formed by cutting a first notch in an inner peripheral surface of said inner ring towards outer peripheral side, and said outlet passage includes a first outlet passage formed by cutting a second notch in an outer peripheral surface of said inner ring towards an inner peripheral side, wherein said first notch and said second notch are formed in different circumferential direction positions relative to said support member, said second notch being non-annular, wherein said bearing providing space forms said branch route, both ends of said bearing providing space being connected to said main route extending in parallel with said first inlet passage at the same location in an axial direction but at the different location in a radial direction, and wherein an orifice is provided at an inlet part of said branch route.

2. The fluid transmission device according to claim 1, wherein said lockup mechanism comprises a clutch guide connected to said cover member, a clutch hub connected to said turbine runner, and a frictional engagement member disposed in a clutch space surrounded by said clutch guide and said clutch hub, which is engaged and disengaged in accordance with an operation of said clutch piston, wherein said lockup chamber is partitioned by said clutch guide and said clutch hub into an inner peripheral side space on a diametrical direction inner peripheral side and an outer peripheral side space on a diametrical direction outer peripheral side via said clutch space, wherein said clutch guide is formed with a guide side through hole connecting one of said outer peripheral side space and said inner peripheral side space in said lockup chamber with said clutch space while said clutch hub is formed with a hub side through hole connecting the other of said outer peripheral side space and said inner peripheral side space in said lockup chamber with said clutch space, and wherein said inlet passage is connected to said inner peripheral side space while said communicating passage is connected to said outer peripheral side space.

3. The fluid transmission device according to claim 1, wherein said pump impeller is supported rotatably by a pump side thrust bearing positioned between an inner peripheral portion side face of said pump impeller and an inner peripheral portion side face of said stator and held by a holding member provided on said inner peripheral portion side face of said stator, and wherein said outlet passage includes a passage comprised of a recessed groove formed in a back surface of said holding member so as to extend radially on a side face of said stator.

4. The fluid transmission device according to claim 1, wherein a fitting portion structure comprised of a cover side fitting member provided on an inner peripheral surface of said cover member and a piston side fitting member provided on a back surface of said clutch piston is provided in said clutch oil chamber, and by fitting said cover side fitting member to said piston side fitting member, said clutch piston can rotate integrally with and move axially relative to said cover member.

5. The fluid transmission device according to claim 1, wherein said turbine runner is supported rotatably by a turbine side thrust bearing disposed between an inner peripheral portion side face of said turbine runner and an inner peripheral portion side face of said stator, and wherein said turbine side thrust bearing is covered by a cover to restrict a flow of working oil between said inner peripheral portion side face of said turbine runner and said inner peripheral portion side face of said stator.

6. The fluid transmission device according to claim 1, wherein said lockup mechanism comprises a clutch guide connected to said cover member, a clutch hub connected to said turbine runner, and a frictional engagement member disposed in a clutch space surrounded by said clutch guide and said clutch hub, which is engaged and disengaged in accordance with an operation of said clutch piston, wherein said lockup chamber is partitioned by said clutch guide and said clutch hub into an inner peripheral side space on a diametrical direction inner peripheral side and an outer peripheral side space on a diametrical direction outer peripheral side via said clutch space, wherein said clutch guide is formed with a guide side through hole connecting one of said outer peripheral side space and said inner peripheral side space in said lockup chamber with said clutch space while said clutch hub is formed with first and second hub side through holes connecting the other of said outer peripheral side space and said inner peripheral side space in said lockup chamber with said clutch space, wherein said inlet passage is connected to said inner peripheral side space and said communicating passage is connected to said outer peripheral side space, wherein said first hub side through hole radially penetrates a tooth tip portion forming a small diameter side surface in an outer peripheral portion having a spline groove and said second hub side through hole radially penetrates a tooth base portion forming a large diameter side surface in the outer peripheral portion, wherein said guide side through hole radially penetrates a tooth base portion forming a large diameter side surface of the spline groove, and wherein said clutch space and said outer peripheral side communicate through said guide side through hole.

7. The fluid transmission device according to claim 6, wherein said first hub side through hole is larger than said second hub side through hole.

* * * * *